United States Patent
McCabe et al.

(10) Patent No.: US 9,634,975 B2
(45) Date of Patent: *Apr. 25, 2017

(54) SYSTEMS AND METHODS FOR DISTRIBUTED ELECTRONIC SIGNATURE DOCUMENTS

(71) Applicant: DocuSign, Inc., Seattle, WA (US)

(72) Inventors: Andrew D. McCabe, Indianola, WA (US); Thomas H. Gonser, Jr., Bellevue, WA (US)

(73) Assignee: DocuSign, Inc., San Francisco, CA (US)

( * ) Notice: Subject to any disclaimer, the term of this patent is extended or adjusted under 35 U.S.C. 154(b) by 364 days.

This patent is subject to a terminal disclaimer.

(21) Appl. No.: 14/179,507

(22) Filed: Feb. 12, 2014

(65) Prior Publication Data

US 2014/0164542 A1 Jun. 12, 2014

Related U.S. Application Data

(63) Continuation of application No. 12/490,602, filed on Jun. 24, 2009, now Pat. No. 8,655,961, which is a
(Continued)

(51) Int. Cl.
*G06F 15/16* (2006.01)
*G06F 15/173* (2006.01)
(Continued)

(52) U.S. Cl.
CPC .............. *H04L 51/18* (2013.01); *G06F 21/64* (2013.01); *G06F 21/645* (2013.01); *G06Q 10/10* (2013.01); *H04L 51/34* (2013.01)

(58) Field of Classification Search
CPC ....... G06F 21/64; G06F 21/645; H04L 51/34; H04L 51/18; G06Q 10/10
(Continued)

(56) References Cited

U.S. PATENT DOCUMENTS 5,040,142 A 8/1991 Mori et al.
5,220,675 A 6/1993 Padawer et al.
(Continued)

FOREIGN PATENT DOCUMENTS

CN 101299256 11/2008
EP 1238321 6/2001
(Continued)

OTHER PUBLICATIONS

Wheeler et al., "DocuSign Unveils new Scalable Product and Support Offerings of Electronic Signature and Electronic Contract Execution," DocuSign The Fastest Way to Get a Signature, 2 pp., Jan. 2008.
(Continued)

*Primary Examiner* — Kenneth R Coulter
(74) *Attorney, Agent, or Firm* — Schwegman, Lundberg & Woessner, P.A.

(57) ABSTRACT

Systems and methods for providing a report describing the status of an electronic envelope. The electronic envelope includes a first electronic document to be distributed for electronic signature and an electronic signing template defining a set of at least one task that must be performed by an executor of the first electronic document to complete the electronic signature. The first electronic document is subject to a workflow including a plurality of events. The method includes receiving from a monitoring entity a selection of an identifier of an event of the plurality. The progress of the first electronic document through the workflow is monitored. That the at least one event has occurred with respect to the first electronic document is determined. In response to determining that the at least one event has occurred, the monitoring entity is notified of such.

20 Claims, 5 Drawing Sheets

Related U.S. Application Data continuation-in-part of application No. 12/176,265, filed on Jul. 18, 2008, now Pat. No. 8,949,706.

(60) Provisional application No. 60/950,563, filed on Jul. 18, 2007.

(51) Int. Cl.
  *H04L 12/58* (2006.01)
  *G06F 21/64* (2013.01)
  *G06Q 10/10* (2012.01)

(58) Field of Classification Search
  USPC .......................................... 709/224, 204–206
  See application file for complete search history.

(56) References Cited

U.S. PATENT DOCUMENTS

| | | | |
|---|---|---|---|
| 5,222,138 A | 6/1993 | Balabon et al. | |
| 5,337,360 A | 8/1994 | Fischer | |
| 5,390,247 A | 2/1995 | Fischer | |
| 5,465,299 A | 11/1995 | Matsumoto et al. | |
| 5,544,255 A | 8/1996 | Smithies et al. | |
| 5,553,145 A | 9/1996 | Micali | |
| 5,615,268 A | 3/1997 | Bisbee et al. | |
| 5,629,982 A | 5/1997 | Micali | |
| 5,689,567 A | 11/1997 | Miyauchi | |
| 5,748,738 A | 5/1998 | Bisbee et al. | |
| 5,813,009 A | 9/1998 | Johnson et al. | |
| 5,832,499 A | 11/1998 | Gustman | |
| 5,872,848 A | 2/1999 | Romney et al. | |
| 5,898,156 A | 4/1999 | Wilfong | |
| 6,021,202 A | 2/2000 | Anderson et al. | |
| 6,067,531 A | 5/2000 | Hoyt et al. | |
| 6,085,322 A | 7/2000 | Romney et al. | |
| 6,092,080 A | 7/2000 | Gustman | |
| 6,119,229 A | 9/2000 | Martinez et al. | |
| 6,128,740 A | 10/2000 | Curry et al. | |
| 6,161,139 A | 12/2000 | Win et al. | |
| 6,185,587 B1 | 2/2001 | Bernardo et al. | |
| 6,185,683 B1 | 2/2001 | Ginter et al. | |
| 6,199,052 B1 | 3/2001 | Mitty et al. | |
| 6,210,276 B1 | 4/2001 | Mullins | |
| 6,237,096 B1 | 5/2001 | Bisbee et al. | |
| 6,289,460 B1 | 9/2001 | Hajmiragha | |
| 6,321,333 B1 | 11/2001 | Murray | |
| 6,327,656 B2 | 12/2001 | Zabetian | |
| 6,367,010 B1 | 4/2002 | Venkatram et al. | |
| 6,367,013 B1 | 4/2002 | Bisbee et al. | |
| 6,446,115 B2 | 9/2002 | Powers | |
| 6,470,448 B1 | 10/2002 | Kuroda et al. | |
| 6,584,466 B1 | 6/2003 | Serbinis et al. | |
| 6,615,348 B1 | 9/2003 | Gibbs | |
| 6,658,403 B1 | 12/2003 | Kuroda et al. | |
| 6,671,805 B1 | 12/2003 | Brown et al. | |
| 6,728,762 B1 | 4/2004 | Estrada et al. | |
| 6,751,632 B1 | 6/2004 | Petrogiannis | |
| 6,754,829 B1 | 6/2004 | Butt et al. | |
| 6,796,489 B2 | 9/2004 | Slater et al. | |
| 6,807,633 B1 | 10/2004 | Pavlik | |
| 6,829,635 B1 | 12/2004 | Townshend | |
| 6,912,660 B1 | 6/2005 | Petrogiannis | |
| 6,931,420 B1 | 8/2005 | Silvester et al. | |
| 6,938,157 B2 | 8/2005 | Kaplan | |
| 6,944,648 B2 | 9/2005 | Cochran et al. | |
| 6,947,911 B1 | 9/2005 | Moritsu et al. | |
| 6,959,382 B1 | 10/2005 | Kinnis et al. | |
| 6,961,854 B2 | 11/2005 | Serret-Avila et al. | |
| 6,973,569 B1 | 12/2005 | Anderson et al. | |
| 6,990,684 B2 | 1/2006 | Futamura et al. | |
| 7,039,805 B1 | 5/2006 | Messing | |
| 7,059,516 B2 | 6/2006 | Matsuyama et al. | |
| 7,069,443 B2 | 6/2006 | Berringer et al. | |
| 7,093,130 B1 | 8/2006 | Kobayashi et al. | |
| 7,100,045 B2 | 8/2006 | Yamada et al. | |
| 7,103,778 B2 | 9/2006 | Kon et al. | |
| 7,162,635 B2 | 1/2007 | Bisbee et al. | |
| 7,167,844 B1 | 1/2007 | Leong et al. | |
| 7,197,644 B2 | 3/2007 | Brewington | |
| 7,237,114 B1 | 6/2007 | Rosenberg | |
| 7,340,608 B2 | 3/2008 | Laurie et al. | |
| 7,360,079 B2 | 4/2008 | Wall | |
| 7,395,436 B1 | 7/2008 | Nemovicher | |
| 7,424,543 B2 | 9/2008 | Rice, III | |
| 7,437,421 B2 | 10/2008 | Bhogal et al. | |
| 7,523,315 B2 | 4/2009 | Hougaard et al. | |
| 7,533,268 B1 | 5/2009 | Catoricini et al. | |
| 7,554,576 B2 | 6/2009 | Erol et al. | |
| 7,562,053 B2 | 7/2009 | Twining et al. | |
| 7,568,101 B1 | 7/2009 | Catoricini et al. | |
| 7,568,104 B2 | 7/2009 | Berryman et al. | |
| 7,581,105 B2 | 8/2009 | Dietl | |
| 7,657,832 B1 | 2/2010 | Lin | |
| 7,660,863 B2 | 2/2010 | Boursetty et al. | |
| 7,788,259 B2 | 8/2010 | Patterson et al. | |
| 7,934,098 B1 | 4/2011 | Hahn et al. | |
| 7,953,977 B2 | 5/2011 | Maruyama et al. | |
| 8,103,867 B2 | 1/2012 | Spitz | |
| 8,132,013 B2 | 3/2012 | Meier | |
| 8,286,071 B1 | 10/2012 | Zimmerman et al. | |
| 8,588,483 B2 | 11/2013 | Hicks et al. | |
| 8,612,349 B1 | 12/2013 | Ledder et al. | |
| 8,650,038 B2 * | 2/2014 | Peirson, Jr. ............ | G06Q 10/00 705/1.1 |
| 8,655,961 B2 * | 2/2014 | McCabe ................ | G06F 21/64 709/206 |
| 8,949,706 B2 * | 2/2015 | McCabe ................ | G06Q 10/10 713/179 |
| 2001/0018739 A1 | 8/2001 | Anderson et al. | |
| 2001/0034739 A1 | 10/2001 | Anecki et al. | |
| 2001/0034835 A1 | 10/2001 | Smith | |
| 2002/0004800 A1 | 1/2002 | Kikuta et al. | |
| 2002/0019937 A1 | 2/2002 | Edstrom et al. | |
| 2002/0026427 A1 | 2/2002 | Kon et al. | |
| 2002/0026582 A1 | 2/2002 | Futamura et al. | |
| 2002/0040431 A1 | 4/2002 | Kato et al. | |
| 2002/0069179 A1 | 6/2002 | Slater et al. | |
| 2002/0069358 A1 | 6/2002 | Silvester | |
| 2002/0099733 A1 | 7/2002 | Teruuchi et al. | |
| 2002/0129056 A1 | 9/2002 | Conant et al. | |
| 2002/0138445 A1 | 9/2002 | Laage et al. | |
| 2002/0143711 A1 | 10/2002 | Nassiri | |
| 2002/0162000 A1 | 10/2002 | Bensler | |
| 2002/0178187 A1 | 11/2002 | Rasmussen et al. | |
| 2002/0184485 A1 | 12/2002 | Dray et al. | |
| 2002/0194219 A1 | 12/2002 | Bradley et al. | |
| 2002/0196478 A1 | 12/2002 | Struble | |
| 2003/0048301 A1 | 3/2003 | Menninger | |
| 2003/0051016 A1 | 3/2003 | Miyoshi et al. | |
| 2003/0056100 A1 | 3/2003 | Beatson | |
| 2003/0078880 A1 * | 4/2003 | Alley ................... | G06F 21/645 705/38 |
| 2003/0120553 A1 | 6/2003 | Williams | |
| 2003/0120930 A1 | 6/2003 | Simpson et al. | |
| 2003/0131073 A1 | 7/2003 | Lucovsky et al. | |
| 2003/0140252 A1 | 7/2003 | Lafon et al. | |
| 2003/0217275 A1 | 11/2003 | Bentley et al. | |
| 2004/0054606 A1 | 3/2004 | Broerman | |
| 2004/0078337 A1 | 4/2004 | King et al. | |
| 2004/0107352 A1 | 6/2004 | Yui et al. | |
| 2004/0117627 A1 | 6/2004 | Brewington | |
| 2004/0133493 A1 | 7/2004 | Ford et al. | |
| 2004/0181756 A1 | 9/2004 | Berringer et al. | |
| 2004/0225884 A1 | 11/2004 | Lorenzini et al. | |
| 2004/0230891 A1 | 11/2004 | Pravetz et al. | |
| 2004/0250070 A1 | 12/2004 | Wong | |
| 2004/0255114 A1 | 12/2004 | Lee et al. | |
| 2004/0255127 A1 | 12/2004 | Arnouse | |
| 2005/0033811 A1 | 2/2005 | Bhogal et al. | |
| 2005/0049903 A1 | 3/2005 | Raja | |
| 2005/0076215 A1 | 4/2005 | Dryer | |
| 2005/0091143 A1 | 4/2005 | Schmidt et al. | |
| 2005/0120217 A1 | 6/2005 | Fifield et al. | |
| 2005/0165626 A1 | 7/2005 | Karpf | |

(56) References Cited

U.S. PATENT DOCUMENTS

| | | |
|---|---|---|
| 2005/0182684 A1 | 8/2005 | Dawson et al. |
| 2005/0182956 A1 | 8/2005 | Ginter et al. |
| 2005/0192908 A1 | 9/2005 | Jorimann et al. |
| 2005/0231738 A1 | 10/2005 | Huff et al. |
| 2006/0047600 A1 | 3/2006 | Bodenheim et al. |
| 2006/0161780 A1 | 7/2006 | Berryman et al. |
| 2006/0161781 A1 | 7/2006 | Rice et al. |
| 2006/0174199 A1 | 8/2006 | Soltis et al. |
| 2006/0205476 A1 | 9/2006 | Jubinville |
| 2006/0259440 A1 | 11/2006 | Leake et al. |
| 2006/0261545 A1 | 11/2006 | Rogers |
| 2006/0294152 A1 | 12/2006 | Kawabe et al. |
| 2007/0026927 A1 | 2/2007 | Yaldoo et al. |
| 2007/0079139 A1 | 4/2007 | Kim |
| 2007/0088958 A1 | 4/2007 | Qa'Im-maqami |
| 2007/0118732 A1 | 5/2007 | Whitmore |
| 2007/0130186 A1 | 6/2007 | Ramsey et al. |
| 2007/0136361 A1 | 6/2007 | Lee et al. |
| 2007/0143085 A1 | 6/2007 | Kimmel |
| 2007/0165865 A1 | 7/2007 | Talvitie |
| 2007/0198533 A1 | 8/2007 | Foygel et al. |
| 2007/0208944 A1 | 9/2007 | Pavlicic |
| 2007/0220260 A1 | 9/2007 | King |
| 2007/0271592 A1 | 11/2007 | Noda et al. |
| 2007/0289022 A1 | 12/2007 | Wittkotter |
| 2008/0016357 A1 | 1/2008 | Suarez |
| 2008/0034213 A1 | 2/2008 | Boemker et al. |
| 2008/0097777 A1 | 4/2008 | Rielo |
| 2008/0141033 A1 | 6/2008 | Ginter et al. |
| 2008/0209313 A1 | 8/2008 | Gonser |
| 2008/0209516 A1 | 8/2008 | Nassiri |
| 2008/0216147 A1 | 9/2008 | Duffy |
| 2008/0235577 A1 | 9/2008 | Veluchamy et al. |
| 2008/0260287 A1 | 10/2008 | Berryman et al. |
| 2008/0313723 A1 | 12/2008 | Naono et al. |
| 2009/0024912 A1 | 1/2009 | McCabe et al. |
| 2009/0025087 A1* | 1/2009 | Peirson, Jr. ............ G06Q 10/00 726/27 |
| 2009/0044019 A1 | 2/2009 | Lee et al. |
| 2009/0099881 A1 | 4/2009 | Hanna et al. |
| 2009/0132351 A1 | 5/2009 | Gibson |
| 2009/0138730 A1 | 5/2009 | Cook et al. |
| 2009/0145958 A1 | 6/2009 | Stoutenburg et al. |
| 2009/0185241 A1 | 7/2009 | Nepomniachtchi |
| 2009/0268903 A1 | 10/2009 | Bojinov et al. |
| 2009/0292786 A1 | 11/2009 | McCabe et al. |
| 2010/0088364 A1 | 4/2010 | Carter et al. |
| 2010/0122094 A1 | 5/2010 | Shima |
| 2010/0153011 A1 | 6/2010 | Obrea et al. |
| 2010/0217987 A1 | 8/2010 | Shevade |
| 2010/0235727 A1 | 9/2010 | Ashton et al. |
| 2010/0274863 A1 | 10/2010 | Foygel et al. |
| 2010/0287260 A1 | 11/2010 | Peterson et al. |
| 2010/0293094 A1 | 11/2010 | Kolkowitz et al. |
| 2011/0093769 A1 | 4/2011 | Dunn et al. |
| 2011/0119165 A1 | 5/2011 | Zee |
| 2011/0126022 A1 | 5/2011 | Sieberer |
| 2011/0238510 A1 | 9/2011 | Rowen et al. |
| 2011/0264907 A1 | 10/2011 | Betz et al. |
| 2011/0314371 A1 | 12/2011 | Peterson et al. |
| 2012/0180135 A1 | 7/2012 | Hodges et al. |
| 2012/0209970 A1 | 8/2012 | Scipioni et al. |
| 2012/0271882 A1 | 10/2012 | Sachdeva et al. |
| 2012/0304265 A1 | 11/2012 | Richter et al. |
| 2013/0019156 A1 | 1/2013 | Gonser et al. |
| 2013/0019289 A1 | 1/2013 | Gonser et al. |
| 2013/0050512 A1 | 2/2013 | Gonser et al. |
| 2013/0067243 A1 | 3/2013 | Tamayo-Rios et al. |
| 2013/0159720 A1 | 6/2013 | Gonser et al. |
| 2013/0179676 A1 | 7/2013 | Hamid |
| 2013/0254111 A1 | 9/2013 | Gonser et al. |
| 2013/0263283 A1 | 10/2013 | Peterson et al. |
| 2014/0019761 A1 | 1/2014 | Shapiro |
| 2015/0067464 A1 | 3/2015 | McCabe et al. |

FOREIGN PATENT DOCUMENTS

| | | |
|---|---|---|
| JP | 2000048072 | 2/2000 |
| JP | 2003271529 | 9/2003 |
| JP | 2005267438 | 9/2005 |
| JP | 2008117258 | 5/2008 |
| JP | 2008225527 | 9/2008 |
| KR | 20000049674 | 8/2000 |
| KR | 1020020092595 | 12/2002 |
| KR | 1020070059931 | 6/2007 |
| KR | 100929488 | 12/2009 |
| KR | 20090122657 | 12/2009 |
| RU | 2400811 | 11/2005 |
| RU | 2291491 | 10/2007 |
| RU | 2300844 | 6/2010 |
| WO | 9607156 | 3/1996 |
| WO | WO-9607156 A1 | 3/1996 |
| WO | 03091834 | 11/2003 |
| WO | WO-03091834 A2 | 11/2003 |
| WO | 2007075235 | 7/2007 |
| WO | 2008124627 | 10/2008 |
| WO | 2009012478 | 1/2009 |
| WO | WO-2009012478 A3 | 1/2009 |
| WO | 2010105262 | 9/2010 |
| WO | WO-2010151630 A3 | 12/2010 |

OTHER PUBLICATIONS

Borozdin et al., "DocuSign Connect Service Guide," DocuSign, Inc., pp. 1-9, 2008.

eLynx Adds Workflow Management to Electronic Document Platform—new Workflow Capabilities Provide for Enhanced Electronic Loan Processing, eLynx, 2 pp. Jan. 2009.

Laurens Leurs; The history of PDF; Feb. 14, 2010; pp. 1-12.

Brown, "Digital Signatures: Can They Be Accepted As Legal Signatures in EID?", Dec. 1993, ACM, p. 86-92.

Herzberg et al., "Surf'N'Sign: Client Signatures on Web Documents", 1998, IEEE, vol. 37 Issue 1, p. 61-71.

Kwok et al., "An Automatic Electronic Contract Document Signing System in a Secure Environment", 2005, IEEE, p. 497-502.

Su et al., "Signature-In-Signature Verification Via a Secure Simple Network Protocol", 2010, IEEE, p. 1-4.

Zefferer et al., "An Electronic-Signature Based Circular Resolution Database System," Mar. 2010, ACM, p. 1840-1845.

Kamara et al., "Cryptographic Cloud Storage", 2010, Financial Cryptography and Data Security, p. 136-149.

Harold, Elliotte Rusty, XML Bible. IDG Books Worldwide, Inc., 1999, p. 191-192.

"U.S. Appl. No. 12/176,265, Advisory Action mailed Jul. 19, 2012", 3 pgs.

"U.S. Appl. No. 12/176,265, Final Office Action mailed Apr. 17, 2012", 13 pgs.

"U.S. Appl. No. 12/176,265, Final Office Action mailed Jul. 14, 2014", 22 pgs.

"U.S. Appl. No. 12/176,265, Non Final Office Action mailed Feb. 14, 2013", 15 pgs.

"U.S. Appl. No. 12/176,265, Non Final Office Action mailed Sep. 7, 2011", 11 pgs.

"U.S. Appl. No. 12/176,265, Non Final Office Action mailed Nov. 26, 2013", 17 pgs.

"U.S. Appl. No. 12/176,265, Notice of Allowance mailed Oct. 24, 2014", 9 pgs.

"U.S. Appl. No. 12/176,265, Notice of Allowance mailed Dec. 16, 2014", 2 pgs.

"U.S. Appl. No. 12/176,265, Response filed Feb. 26, 2014 to Non Final Office Action mailed Nov. 26, 2013", 12 pgs.

"U.S. Appl. No. 12/176,265, Response filed May 24, 2012 to Final Office Action mailed Apr. 17, 2012", 9 pgs.

"U.S. Appl. No. 12/176,265, Response filed Jul. 15, 2013 to Non Final Office Action mailed Feb. 14, 2013", 11 pgs.

"U.S. Appl. No. 12/176,265, Response filed Jul. 17, 2012 to Advisory Action mailed Jul. 9, 2012", 12 pgs.

"U.S. Appl. No. 12/176,265, Response filed Oct. 6, 2014 to Final Office Action mailed Jul. 14, 2014", 8 pgs.

(56) References Cited

OTHER PUBLICATIONS

"U.S. Appl. No. 12/176,265, Response filed Dec. 7, 2011 to Non Final Office Action mailed Sep. 7, 2011", 9 pgs.
"U.S. Appl. No. 12/490,602, Final Office Action mailed Apr. 1, 2013", 14 pgs.
"U.S. Appl. No. 12/490,602, Non Final Office Action mailed Jun. 28, 2012", 13 pgs.
"U.S. Appl. No. 12/490,602, Notice of Allowance mailed Oct. 9, 2013", 9 pgs.
"U.S. Appl. No. 12/490,602, Response filed Jul. 1, 2013 to Final Office Action mailed Apr. 1, 2013", 16 pgs.
"U.S. Appl. No. 12/490,602, Response filed Oct. 29, 2012 to Non Final Office Action mailed Jun. 28, 2012", 13 pgs.
"U.S. Appl. No. 14/537,713, Preliminary Amendment filed Jan. 30, 2015", 7 pgs.
"Australian Application Serial No. 2010264441, First Examiner Report mailed Sep. 25, 2014", 3 pgs.
"Canadian Application Serial No. 2,731,116, Office Action mailed Nov. 27, 2014", 3 pgs.
"Canadian Application Serial No. 2,731,116, Response filed May 27, 2015 to Office Action mailed Nov. 27, 2014", 30 pgs.
"European Application Serial No. 10792640.4, Examination Notification Art. 94(3) mailed Apr. 8, 2014", 8 pgs.
"European Application Serial No. 10792640.4, Extended European Search Report mailed Aug. 16, 2013", 8 pgs.
"European Application Serial No. 10792640.4, Office Action mailed Feb. 6, 2012", 2 pgs.
"European Application Serial No. 10792640.4, Response filed Mar. 12, 2014 to Extended European Search Report mailed Aug. 16, 2013", 14 pgs.
"European Application Serial No. 10792640.4, Response filed Aug. 18, 2014 to Examination Notification Art. 94(3) mailed Apr. 8, 2014", 15 pgs.
"International Application Serial No. PCT/US2008/070566, International Preliminary Report on Patentability mailed Feb. 19, 2010", 5 pgs.
"International Application Serial No. PCT/US2008/070566, International Search Report mailed Feb. 19, 2009", 2 pgs.
"International Application Serial No. PCT/US2008/070566, Written Opinion mailed Feb. 19, 2009", 4 pgs.
"International Application Serial No. PCT/US2010/039768, International Preliminary Report on Patentability mailed Jan. 12, 2012", 5 pgs.
"International Application Serial No. PCT/US2010/039768, International Search Report mailed Feb. 23, 2011", 3 pgs.
"International Application Serial No. PCT/US2010/039768, Written Opinion mailed Feb. 23, 2011", 4 pgs.
"Japanese Application Serial No. 2012-517717, Notification of Reasons of Refusal mailed Jan. 14, 2014", with English translation of claims, 5 pgs.
"Japanese Application Serial No. 2012-517717, Response filed Jun. 12, 2014", 12 pgs.
U.S. Appl. No. 14/537,713, filed Nov. 10, 2014, Systems and Methods for Distributed Electronic Signature Documents.

* cited by examiner

SYSTEMS AND METHODS FOR DISTRIBUTED ELECTRONIC SIGNATURE DOCUMENTS

PRIORITY CLAIM

This application is a continuation of U.S. application Ser. No. 12/490,602 filed Jun. 24, 2009, which is a continuation-in-part of U.S. application Ser. No. 12/176,265 filed Jul. 18, 2008, which claims priority to and the benefit of the filing date of U.S. Provisional Application Ser. No. 60/950,563 filed Jul. 18, 2007, which is incorporated by reference in its entirety.

BACKGROUND OF THE INVENTION

Email is a popular way of transferring contract documents in the marketplace. Currently, there does not exist an effective system or method for a person to email a document or file to another person and have them fill-in and sign the document in such a way as to enforce a legally binding electronic signature process.

In order to create a legally binding document, the signer must be authenticated, the document may not be modified and the sequence of signing must be controlled. Standard email systems lack the control over any of these processes. One current method is emailing a PKI signed document. A PKI signed document can be cumbersome because it requires the document to be signed by the sender before it is distributed, then again by the signer when they sign the document, and further requires all parties to have special software and certificates to execute the process. This requirement that all parties pre-establish proper technology in order execute a transaction adds extra burden and cost on both parties to the transaction, which severely limits acceptance of PKI in the marketplace.

Advanced electronic signature services such as DocuSign® enable contracts to be signed with an ESIGN-compliant signature process. However, this service lacks the ability to simply email the source document to a person to sign; it requires the signer to visit and authenticate before they sign the document. It further requires the sender to register each document with the service prior to sending it for signature.

SUMMARY OF THE INVENTION

Systems and methods for providing a report describing the status of an electronic envelope are disclosed. The electronic envelope includes a first electronic document to be distributed for electronic signature and an electronic signing template defining a set of at least one task that must be performed by an executor of the first electronic document to complete the electronic signature. The first electronic document is subject to a workflow including a plurality of events. The method includes receiving from a monitoring entity a selection of an identifier of an event of the plurality. The progress of the first electronic document through the workflow is monitored. That the at least one event has occurred with respect to the first electronic document is determined. In response to determining that the at least one event has occurred, the monitoring entity is notified of such.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Systems and methods for distributed electronic signature documents are disclosed herein. One embodiment of the present invention acts like a "Self Addressed Stamped Envelope" and allows a document to be sent for signature via email. Once the signer receives the document, he/she may fill in necessary fields prior to signing. When the signer is ready to sign, a control embedded in the document enables the signing process to be initiated by the signer and the signing managed by a web service. The web service authenticates the signer and ensures that the content of the contract can/cannot be modified (determined by the creator of the document). The service preferably enforces the workflow and sequencing of the document and adds any fields to the document that the signer added during review and execution. This approach allows any document to be distributed freely for signature via any means along with the ability to be electronically signed without the need for special software or certificates, and there is no requirement for the sender to take specific actions for each document, but rather allows the document to be distributed freely. In a preferred embodiment, the same signable document may be sent to hundreds of recipients via email, each of which may sign their copy, with the result being that all signed copies and all the data provided by the signed copies is securely captured and available to the sender.

Embodiments of the invention may incorporate concepts described in commonly owned U.S. patent application Ser. No. 12/038,728 entitled "SYSTEM AND METHOD FOR DOCUMENT TAGGING TEMPLATES," which is hereby incorporated by reference as if fully set forth herein.

Figure 1:
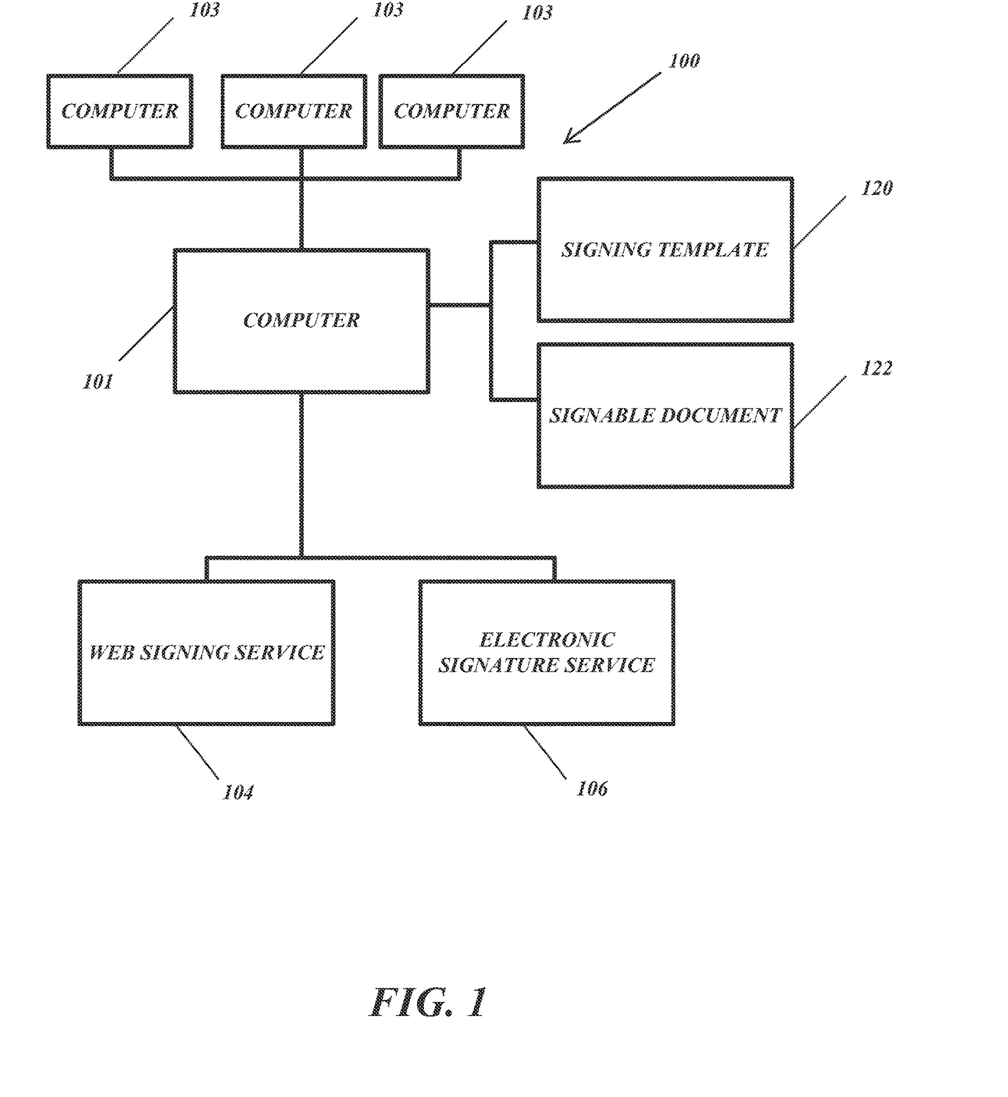
FIG. 1 shows an example system for creation, processing and execution of distributed electronic signature documents.

FIG. 1 shows an example system 100 for creation, processing and execution of distributed electronic signature documents. The system 100 includes a single computer 101, or includes a computer 101 in communication with pluralities of other computers 103. The computer 101 is connected with a web signing service 104 and an electronic signature service 106 over a network such as the Internet. In one embodiment, a bank of servers, a wireless device, a cellular telephone and/or other data capture/entry device can be used in place of the computer 101. An application program, such as a source-client application, is run by the computer 101, which then creates a signing template 120 and/or a signable document 122. The computer 101 can include an application program that allows the signing template 120 and/or the signable document 122 to be sent for signature via email.

The signing template 120 is a file that preferably contains information about the signing process, locations, sequence and authentication. It contains links to any form fields in the signable document that will be used to fully execute the signing template. It may also contain information about the account holder and any limitations on the signing process. It may identify other parties that will also sign, as well as any authentication requirements for any of the signers. The signable document 122 is a document file that preferably contains text and/or graphics along with a customizable control or link (e.g., tag) back to the signing template for execution. The web signing server 104 is a web server on the Internet that preferably hosts the application logic to correlate data transmitted by the embedded control in the signable document 122 with signing template 120 rule sets. An electronic signature service 106, such as the existing DocuSign service, executes the signing template instructions through the web signing server.

Figure 2:
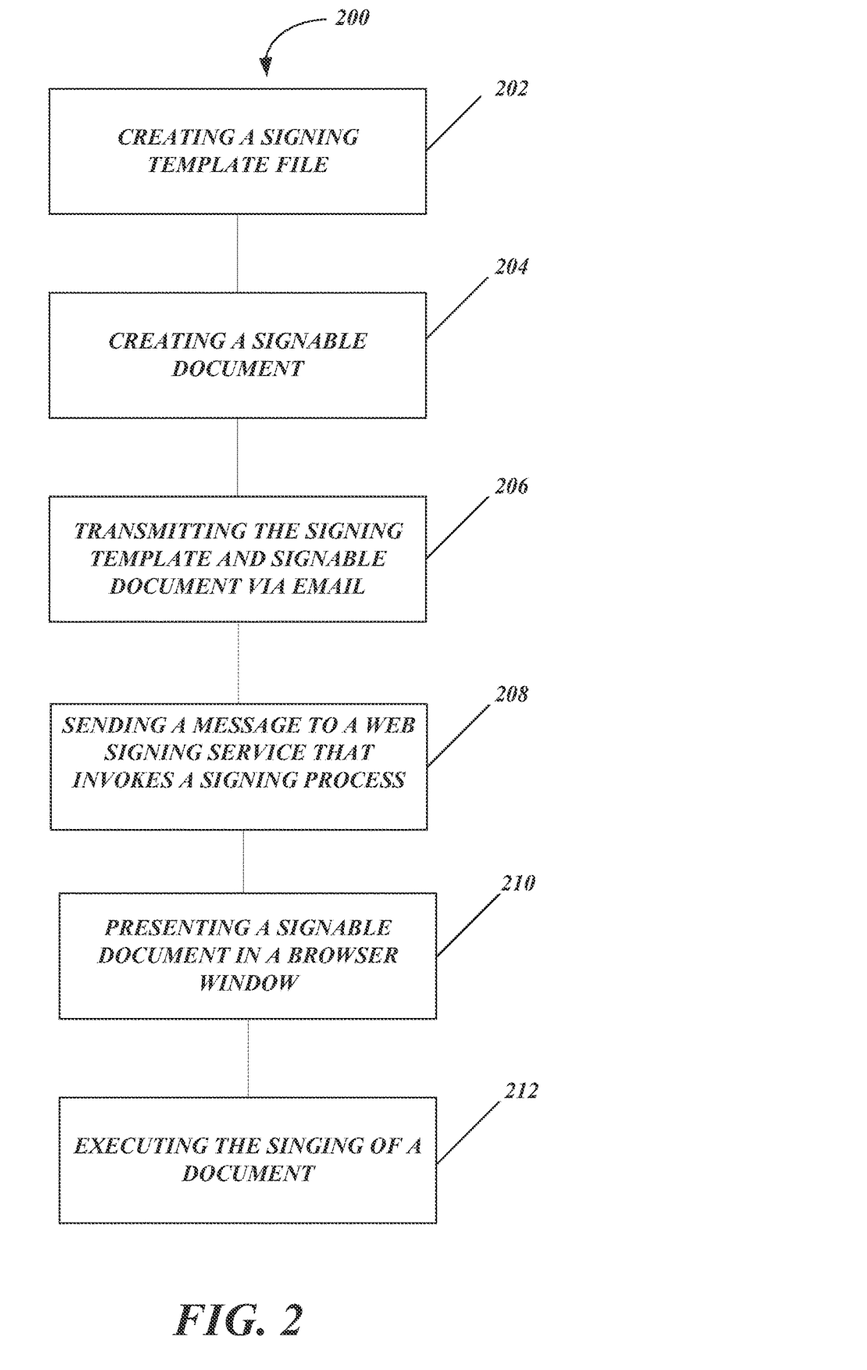
FIG. 2 shows a preferred method for distributed electronic signature documents.

FIG. 2 shows a method for distributed electronic signature documents 200 in one embodiment. At block 202 a document originator creates a signing template file that contains information about how a signable document is to be signed. A document originator may be a user, a party to a transaction, an agency or any entity interested in creating a signable document. The signing template file may include but is not limited to the location of signatures and initials for one or more signers; linkage between form fields in the actual document; information to be used to notify or authenticate the signer; information that may be used by decision systems to decide on different signature execution processes based on what is entered into the document during the signing process; the number of times the signable document can be executed; who will pay for the signature process; information governing whether the signable document content is modifiable by the signer; and other controlling information that may be changed or modified at any time by the sender who has access to it on the web server connected to the Internet. The signing template is preferably stored on a web signing server that is connected to the Internet.

In one embodiment, at block 204, the document originator may create a signable document that is to be distributed to recipients for signing or viewing. The creation of the signing template and signable document preferably occurs in the same application, but may also occur in a different sequence and in different applications. The core signable document preferably includes an embedded control that provides information about the companion signing template. This information is similar to a secure hyperlink that enables the signer to click a button ("SDButton") or a link in the signable document that contains information about how to connect over the Internet to the signing template for processing. The signable document is preferably paired with a signing template; however, there may be multiple signable documents relating back to one or more Signable Templates.

The document originator, at block 206, transmits electronically the signing template and signable document to the signer. In an alternative embodiment, the signing template may be distributed via a simple hyperlink back to the signable document stored on a web server available to the Internet. When the signer is ready and when the SDButton is activated, at block 208, a message is sent to the signing template on the web signing server, which invokes a signing process. This signing process preferably launches a procedure that validates the transaction and uploads the data provided by any form fields in the signable document to the web signing server and invokes a signing process that spawns a local web browser on the signer's computer and begins a signing process as defined by the signing template.

After the signer has been authenticated by the system by any means defined in the signing template, at block 210 a version of the signable document that is created from the server is presented in the browser window. The signing process uses the current method of signing found in the DocuSign service, but may accommodate alternative methods of signing found in similar services. At block 212, the signer signs the document.

Preferably only the form field data from the signer is uploaded to the server and merged into the signing template (which contains the signable document copy). In this embodiment, the signers are not able to modify the underlying documents because this data is not used when the contract is presented to them during the signing process.

In an alternative embodiment, if the sender allows the content to be modified prior to submitting to the web signing server for signing, the entire signable document rather than only the field information is uploaded to the web signing server for handling through the signing process. In this embodiment, the modified document is displayed for the signer to sign in the web signing server.

In another embodiment, the sender does not allow the content to be modified and the entire document is posted to the web signing server for the signing process. Next, a document integrity validation occurs on the posted document to ensure that the underlying content has not been changed.

Once a signable document/signing template pairing has been created, the signable document can be used in many different ways to enable businesses to easily allow electronic signatures to be collected. The following provide non-limiting examples of alternative embodiments as may be desired or dictated by application requirements.

In one example, a business creates a signable document for the company 401k signing sheet and emails it to multiple employees. Each employee opens the file and fills in the form, clicking a button that may say "Sign." The web signing server responds by presenting a web interface that authenticates and presents the document for signature for each employee and collects the signature and any data provided.

In another example, a business creates a signable document for a sales order form and creates the companion signing template, which requests that after the original signer has signed the document must be countersigned internally by two other people before being completed. To execute a sales transaction, the sales representative opens the document, enters in the data required for the sale, and sends the file to the signer for signature. The signer merely clicks the "Sign" button. The web signing server responds by presenting a web interface that authenticates and provides the document for signature to the first signer. Once the first signer has signed, the document is routed to the other two signers for signatures before it is completed.

A business creates a signable document that is unlocked (i.e. the content is changeable) for the company consulting agreement, and a signing template with instructions about the signing process, which ensures the company signer signs second. This contract is edited by both the company and consultant several times before it is deemed to be the final copy. Once the final copy is reached, either party may click the "Submit for Signature" link or button and the web signing server manages the signing process.

A company has an "Account Setup Form" that currently prospects download, print and fill out manually, and faxing the form back to the company for account setup. Using the systems and methods described herein, the sender company creates the form as a signable document linked to a signing template that defines the signing process for opening an account. When the user clicks on a hyperlink on a webpage that says "Open Account," the form is displayed in the browser window, and the user fills out the form using all form fields defined in the signable document (for example a PDF form). When the user clicks "Sign" the web signing server executes the signing process for the document.

Embodiments of the invention include methods and systems for providing a report describing the status of an electronic envelope including one or more electronic documents distributed for electronic signature. Elements of the system 100 may include one or more computer-readable media having stored thereon instructions that, when executed by one or more elements of system 100, enable such elements to implement the described embodiments. For purposes of the present discussion, an envelope may be considered to be a grouping of pre-tagged documents and/or standalone documents, along with associated templates, if any. As such, the electronic envelope may further include an electronic signing template defining one or more tasks that must be performed by an executor of the one or more electronic documents to complete the electronic signature. As discussed herein above, the one or more electronic documents may be subject to a document-execution workflow that includes a plurality of events, which may include the one or more tasks associated with the template.

In an embodiment, a user desiring to monitor the status of electronically signable documents distributed in association with a particular account (e.g., documents distributed by a particular company or individual) may use computer 101, for example, to access information associated with such account, which may be maintained by the administrator of web signing server 104 and/or electronic signature service 106. For example, the user may access a website maintained by such administrator and provide authentication information to access the account in a conventional manner.

Figure 3:
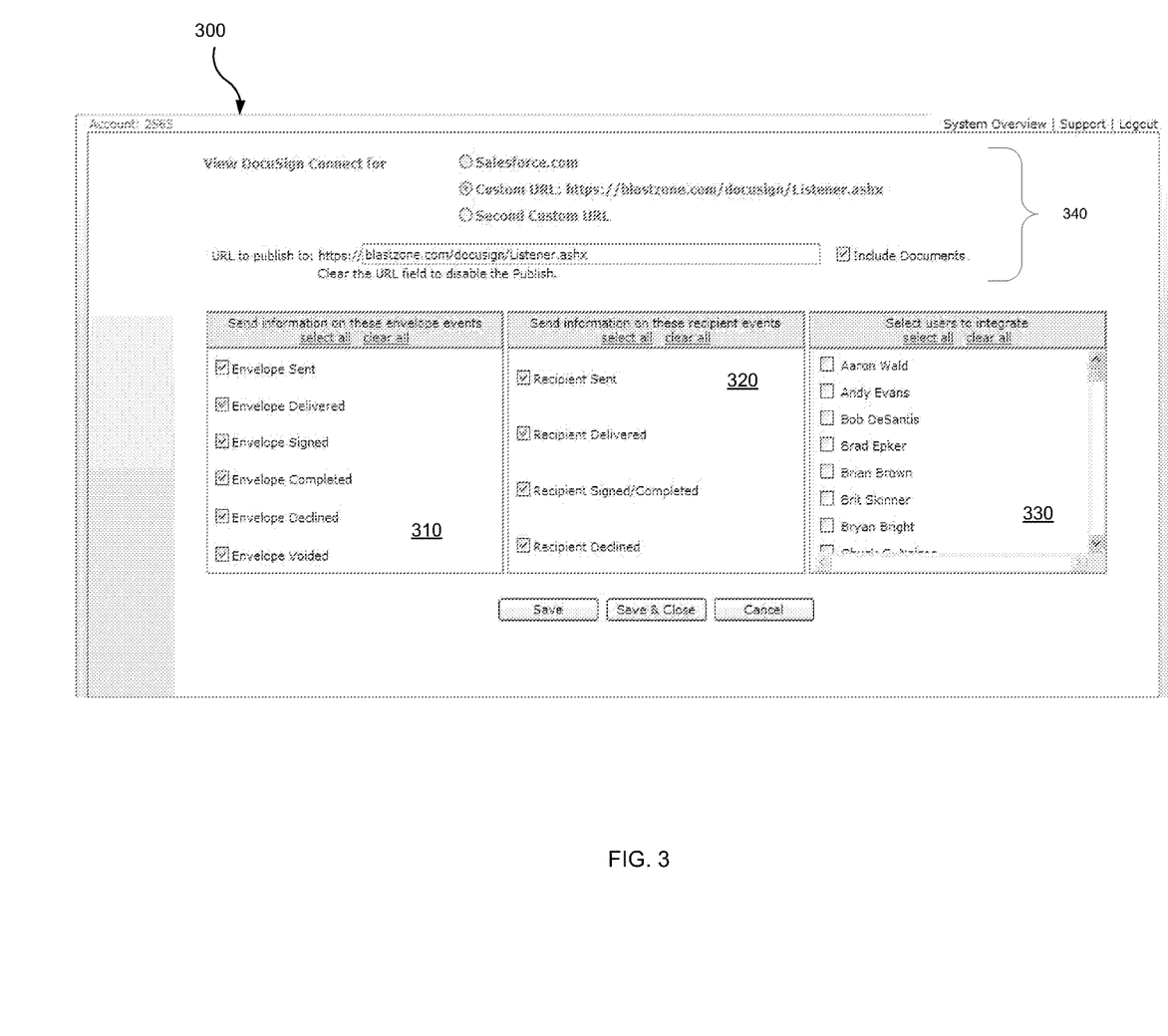
FIG. 3 shows a user interface for customizing status reports according to an embodiment.

Upon accessing the account, and as illustrated in FIG. 3, the administrator may provide to the computer 101 a webpage 300 providing a graphical user interface allowing the user to customize document-monitoring reports. As illustrated in FIG. 3, the page 300 includes a field 310 allowing the user to select from among a number of workflow events (e.g., envelope delivered, envelope signed, etc.) pertaining to all, or a user-selectable set, of the envelopes/documents distributed in association with the account. As such, if, for example, the user selected only the "Envelope Sent" and "Envelope Signed" identifiers in field 310, the user would receive progress reports only upon the occasion of an envelope having been sent and upon the occasion of the envelope having been digitally signed.

As further illustrated in FIG. 3, the page 300 includes a field 320 allowing the user to select from among a number of workflow events (e.g., recipient delivered, recipient signed, etc.) pertaining to all, or a user-selectable set, of the recipients to whom envelopes/documents have been distributed in association with the account. As such, if, for example, the user selected only the "Recipient Sent" and "Recipient Signed" identifiers in field 320, the user would receive progress reports only upon the occasion of an envelope having been sent to a particular recipient or set of recipients and upon the occasion of the envelope having been digitally signed by a particular recipient or set of recipients.

As further illustrated in FIG. 3, the page 300 includes a field 330 allowing the user to select from among a number of individuals associated with the account who have distributed envelopes/documents. As such, by selecting identifiers of particular individuals in field 330, the user would receive progress reports only upon the occasion of events selected in fields 310, 320 occurring with regard to documents distributed by the selected individuals.

As further illustrated in FIG. 3, the page 300 includes a field set 340 allowing the user to select from among a number of predetermined destinations, or to designate a desired destination, to which status reports may be published or sent.

Figure 4:
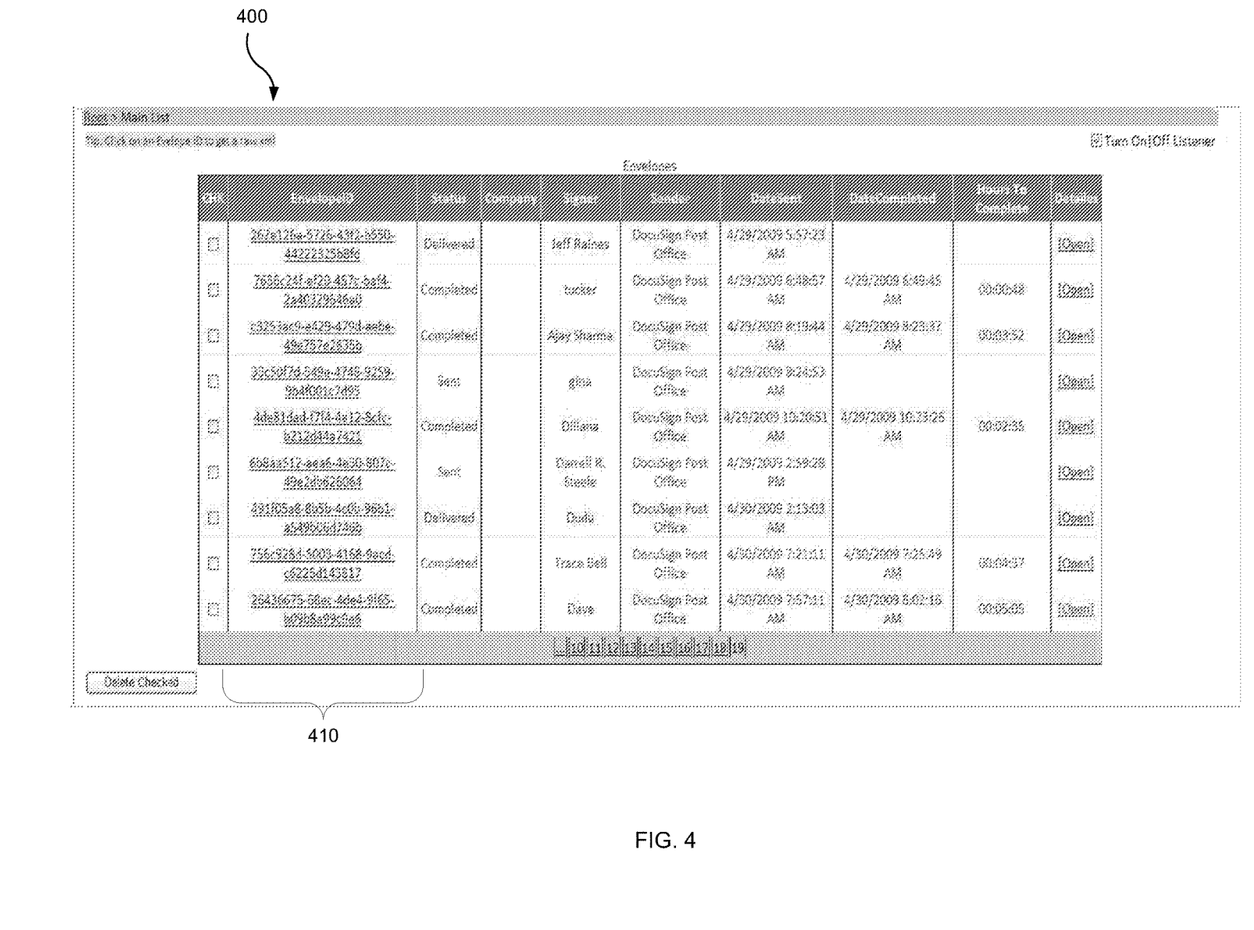
FIG. 4 shows a first status report according to an embodiment.
Figure 5:
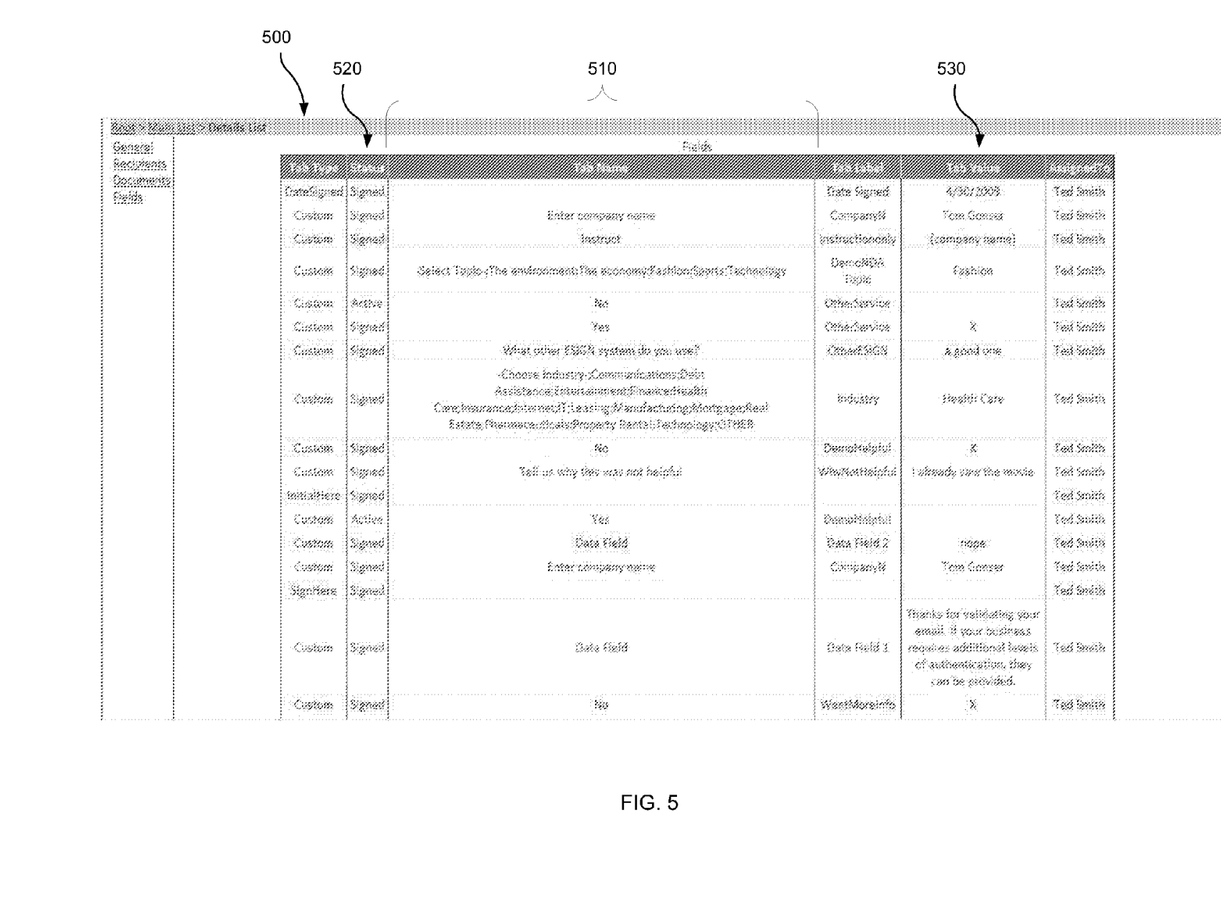
FIG. 5 shows a second status report according to an embodiment.

After the user has made and saved his selections using page 300, the web signing server 104 functions to monitor the progress of each electronic envelope/document as it passes through the workflow. For example, using techniques described elsewhere herein, elements of the system 100 are operable to determine when a tab or other activatable control within a document has been activated (e.g., a document has been electronically signed and/or initialed). Upon determining that a selected event has occurred with respect to an electronic document, the web signing server 104 prepares and publishes a report of the event to the destination designated by the user in field 340 of page 300. FIG. 4 illustrates a webpage 400 associated with the designated report destination listing the envelopes for which selected events have occurred, and providing several types of exemplar information including the status of the envelope, the name of the person who has signed or will be signing the associated document(s), dates of sending and execution of the document(s), and the time elapsed between sending and execution, or delivery and execution) of the document(s). The user can select a link from "EnvelopeID" field 410 to view a more detailed status report pertaining to an associated envelope/document, as illustrated in FIG. 5. In the case of an electronic envelope containing more than one document, such status reports are operable to inform the user of the status of each individual document (e.g., that one document has been signed, while the other has not, and an identification of the signed document).

The report shown in FIG. 5 is in the form of a webpage 500 and provides, among other information, descriptions 510 of the tabbed fields present in the document, the status (e.g., signed, unsigned, not otherwise executed, etc.) 520 of each tabbed field, and identifications 530 of the values assigned by the signer to each tabbed field.

While the preferred embodiment of the invention has been illustrated and described, as noted above, many changes can be made without departing from the spirit and scope of the invention. Accordingly, the scope of the invention is not limited by the disclosure of the preferred embodiment, but to the invention as described above and illustrated in the exemplars shown below.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for providing a report describing a status of an electronic envelope including a first electronic document to be distributed for electronic signature, the first electronic document being subject to a document-execution workflow comprising a plurality of events, the method comprising:

generating, for display on a display device coupled to a client device, a graphical user interlace enabling selection of reporting events from a plurality of events, the graphical user interlace including selectable identifiers of the plurality of events including envelope sent, envelope delivered, and envelope signed;

receiving, via user input received through the graphical user interface, an electronic selection of an identifier, of the selectable identifiers, of at least one event of the plurality of events monitoring progress of the first electronic document through the workflow;

determining that the at least one event has occurred with respect to the first electronic document; and in response to determining that the at least one event has occurred with respect to the first electronic document, updating a reporting graphical user interface to reflect that the at least one event has occurred with respect to the first electronic document, wherein the reporting graphical user interface includes information on the electronic envelope, a signer, a sender, and a status.

2. The method of claim 1, wherein the first electronic document includes an embedded activatable control, and wherein determining that the at least one event has occurred includes receiving an indication that the embedded activatable control has been activated.

3. The method of claim 2, wherein receiving the indication that the embedded activatable control has been activated includes receiving an indication that a user has clicked a button in the first electronic document.

4. The method of claim 1, wherein the electronic envelope includes a second electronic document to be distributed for electronic signature, and further comprising:

monitoring the progress of the second electronic document through the workflow;

determining that the at least one event has occurred with respect to the second electronic document; and in response to determining that the at least one event has occurred with respect to the second electronic document, updating the reporting graphical user interlace to reflect that the at least one event has occurred with respect to the second electronic document.

5. The method of claim 1, further comprising generating the graphical user interface to a display device, wherein the graphical user interface is further configured to receive a selection of one or more users to notify when it is determined that the at least one event has occurred.

6. The method of claim 1, wherein the at least one event comprises completion of the electronic signature of the first electronic document.

7. The method of claim 1, wherein the method is performed by a signing service that is configured to facilitate transactions.

8. The method of claim 7, further comprising receiving from the signing service a selection of a first destination of a plurality of destinations to be notified that the at least one event has occurred with respect to the first electronic document.

9. A system, comprising:

an electronic envelope including a first electronic document to be distributed over a network for electronic signature, the first electronic document being subject to a document-execution work flow comp rising a plurality of events including the at least one task; and a signing service computer that is configured to:

generate, for display on a client device, a graphical user interlace enabling selection of reporting events from a plurality of events, the graphical user interface including selectable identifiers of the plurality of events including envelope sent, envelope delivered, and envelope signed;

receive, via user input received through the graphical user interlace, an electronic selection of an identifier, of the selectable identifiers, of at least one event of the plurality of events monitor, over a network, progress of the first electronic document through the workflow;

determine that the at least one event has occurred with respect to the first electronic document; and in response to determining that the at least one event has occurred with respect to the first electronic document, updating a reporting graphical user interlace to reflect that the at least one event has occurred with respect to the first electronic document, wherein the reporting graphical user interlace includes information on the electronic envelope, a signer, a sender, and a status.

10. The system of claim 9, further comprising a client device that is configured to display the graphical user interface and display the updated reporting graphical user interface reflecting that the at least one event has occurred with respect to the first electronic document.

11. The system of claim 10, wherein:

the client device is further configured to embed into the first document an activatable control; and the signing service computer is further configured to determine that the event has occurred in response to receiving an indication that activated user has clicked a button in the first document.

12. The system of claim 10, wherein the electronic envelope includes a second electronic document to be distributed for electronic signature, and the signing service computer is further configured to:

monitor the progress of the second electronic document through the workflow;

determine that the at least one event has occurred with respect to the second electronic document; and in response to determining that the at least one event has occurred with respect to the second electronic document, update a reporting graphical user interlace to reflect that the at least one event has occurred with respect to the second electronic document.

13. The system of claim 10, wherein the signing service computer is further configured to generate the graphical user interface to a display device associated with the client device, wherein the identifier selection is provided by a user of the client device via the graphical user interface.

14. The system of claim 9, wherein the at least one event comprises completion of the electronic signature of the first electronic document.

15. The system of claim 9, wherein the signing service computer is further configured to receive a selection of a first destination of a plurality of destinations to be notified that the at least one event has occurred with respect to the first electronic document.

16. A non-transitory computer readable medium including instructions that, when executed by a computer, enable the computer to perform steps for providing a report describing a status of an electronic envelope including a first electronic document to be distributed for electronic signature, the first electronic document being subject to a document-execution workflow comprising a plurality of events including the at least one task, the steps comprising:

generating, for display on a display device coupled to a client device, a graphical user interlace enabling selection of reporting events from a plurality of events, the graphical user interlace including selectable identifiers of the plurality of events including envelope sent, envelope delivered, and envelope signed;

receiving from a monitoring entity an electronic selection of an identifier of at least one event of the plurality of events, wherein the electronic selection of the identifier is provided via the graphical user interface;

monitoring, over a network, progress of the first electronic document through the workflow;

determining that the at least one event has occurred with respect to the first electronic document; and in response to determining that the at least one event has occurred with respect to the first electronic document, updating a reporting graphical user interlace to reflect that the at least one event has occurred with respect to the first electronic document.

17. The non-transitory computer readable medium of claim 16, wherein determining that the at least one event has occurred includes receiving the indication that a user has clicked a control embedded within the first electronic document.

18. The non-transitory computer readable medium of claim 16, wherein the graphical user interface is further configured to display identifiers of the plurality of events including envelope completed, envelope declined, and envelope voided.

19. The non-transitory computer readable medium of claim 16, wherein the graphical user interlace is further configured to receive an indication of a destination to which to publish a status report regarding the electronic envelope, wherein the indication of the destination is a uniform resource locator that identifies a Web service, and wherein the updating the reporting graphical user interface comprise publishing the status report to the destination when it is determined that the at least one event has occurred with respect to the first electronic document.

20. The non-transitory computer readable medium of claim 16, wherein the first electronic document is distributed via email for electronic signature and is associated with an electronic signing template defining a set of at least one task that must be performed by an executor of the first electronic document to complete the electronic signature.

* * * * *

UNITED STATES PATENT AND TRADEMARK OFFICE
CERTIFICATE OF CORRECTION

PATENT NO. : 9,634,975 B2
APPLICATION NO. : 14/179507
DATED : April 25, 2017
INVENTOR(S) : McCabe et al.

It is certified that error appears in the above-identified patent and that said Letters Patent is hereby corrected as shown below:

On the Title Page

In item (71), in "Applicant", in Column 1, Line 1, delete "Seattle, WA" and insert --San Francisco, CA-- therefor In the Claims In Column 6, Line 63, in Claim 1, delete "interlace" and insert --interface-- therefor In Column 6, Line 65, in Claim 1, delete "interlace" and insert --interface-- therefor In Column 7, Line 33, in Claim 4, delete "interlace" and insert --interface-- therefor In Column 7, Line 56, in Claim 9, delete "comp rising" and insert --comprising-- therefor In Column 7, Line 60, in Claim 9, delete "interlace" and insert --interface-- therefor In Column 7, Line 66, in Claim 9, delete "interlace," and insert --interface,-- therefor In Column 8, Line 8-9, in Claim 9, delete "interlace" and insert --interface-- therefor In Column 8, Line 11, in Claim 9, delete "interlace" and insert --interface-- therefor In Column 8, Line 36, in Claim 12, delete "interlace" and insert --interface-- therefor In Column 8, Line 61, in Claim 16, delete "interlace" and insert --interface-- therefor In Column 8, Line 63, in Claim 16, delete "interlace" and insert --interface-- therefor Signed and Sealed this
Twenty-fifth Day of June, 2019

Andrei Iancu
*Director of the United States Patent and Trademark Office*

In Column 9, Line 10, in Claim 16, delete "interlace" and insert --interface-- therefor In Column 10, Line 5, in Claim 19, delete "interlace" and insert --interface-- therefor